United States Patent
Lee et al.

(10) Patent No.: US 11,340,936 B2
(45) Date of Patent: May 24, 2022

(54) COMPILING AND SCHEDULING TRANSACTIONS IN NEURAL NETWORK PROCESSOR

(71) Applicant: Apple Inc., Cupertino, CA (US)

(72) Inventors: Seungjin Lee, Los Gatos, CA (US);
Sung Hee Park, Cupertino, CA (US);
Elaina Chai, Stanford, CA (US)

(73) Assignee: Apple Inc., Cupertino, CA (US)

( * ) Notice: Subject to any disclaimer, the term of this patent is extended or adjusted under 35 U.S.C. 154(b) by 1056 days.

(21) Appl. No.: 15/971,208

(22) Filed: May 4, 2018

(65) Prior Publication Data
US 2019/0340010 A1    Nov. 7, 2019

(51) Int. Cl.
| | |
|---|---|
| G06F 9/46 | (2006.01) |
| G06F 9/48 | (2006.01) |
| G06N 7/08 | (2006.01) |
| G06F 9/54 | (2006.01) |
| G06F 8/41 | (2018.01) |
| G06F 13/28 | (2006.01) |
| G06N 3/04 | (2006.01) |
| G06F 9/50 | (2006.01) |

(52) U.S. Cl.
CPC ............. *G06F 9/466* (2013.01); *G06F 8/41* (2013.01); *G06F 9/4881* (2013.01); *G06F 9/5016* (2013.01); *G06F 9/5066* (2013.01); *G06F 9/544* (2013.01); *G06F 13/28* (2013.01); *G06N 3/04* (2013.01); *G06N 7/08* (2013.01)

(58) Field of Classification Search
None
See application file for complete search history.

(56) References Cited

U.S. PATENT DOCUMENTS

| | | | | |
|---|---|---|---|---|
| 6,832,214 | B1 * | 12/2004 | Nguyen | G06F 8/41 |
| | | | | 717/148 |
| 10,445,402 | B1 * | 10/2019 | Wang | G06F 17/15 |
| 2004/0122785 | A1 * | 6/2004 | Brown | G06F 8/52 |
| | | | | 717/140 |
| 2015/0378734 | A1 | 12/2015 | Hansen et al. | |
| 2016/0328646 | A1 * | 11/2016 | Lin | G06V 10/454 |
| 2016/0379115 | A1 | 12/2016 | Burger et al. | |
| 2017/0011288 | A1 * | 1/2017 | Brothers | G06F 9/3017 |
| 2017/0097884 | A1 | 4/2017 | Werner et al. | |
| 2018/0129893 | A1 * | 5/2018 | Son | G06N 3/063 |
| 2018/0189633 | A1 * | 7/2018 | Henry | G06N 3/0445 |
| 2018/0285715 | A1 * | 10/2018 | Son | G06N 3/08 |
| 2018/0285719 | A1 * | 10/2018 | Baum | G06F 5/01 |
| 2018/0285726 | A1 * | 10/2018 | Baum | G06F 7/501 |

OTHER PUBLICATIONS

Fu, J. "Towards Scalable Gradient-Based Hyperparameter Optimization in Deep Neural Networks" National University of Singapore, 2016, 146 pages.

* cited by examiner

*Primary Examiner* — Qing Chen
(74) *Attorney, Agent, or Firm* — Fenwick & West LLP

(57) ABSTRACT

Embodiments relate to a compiler. The compiler decreases data fetch and read associated with storing data in a data buffer of a neural processor circuit to or from a system memory. The data buffer can store an input slice of data for processing by a neural engine(s) of the neural processor circuit, an output slice of data output from the neural engine(s), and/or an intermediate data slice of data.

17 Claims, 12 Drawing Sheets

COMPILING AND SCHEDULING TRANSACTIONS IN NEURAL NETWORK PROCESSOR

BACKGROUND

1. Field of the Disclosure

The present disclosure relates to a circuit for performing convolution neural network and more specifically to a compiler that reduces data fetch and read operations associated transferring data to or from memory external to a neural processor circuit.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), dee neural networks (DNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a compiler that is architected to decrease data fetch and read associated with storing data in a data buffer of a neural processor circuit to or from a system memory. The data buffer can store an input slice of data for processing by a neural engine(s) of the neural processor circuit, an output slice of data output from the neural engine(s), and/or an intermediate data slice of data. An intermediate data slice is a portion of input data that has been segmented into multiple intermediate data slices for processing due to the size of the input data being too large for processing by the neural engine.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a compiler. The compiler is architected to reduce data fetch and read operations associated with a system memory external to a neural processor circuit by using a data buffer internal to the neural processor circuit. By storing data for processing in the data buffer rather than system memory, processing can be performed more efficiently because reading of input data or writing of output data is performed locally most of the time rather than receiving the input data or sending the output data to the system memory external to the neural processor circuit Exemplary Electronic Device Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
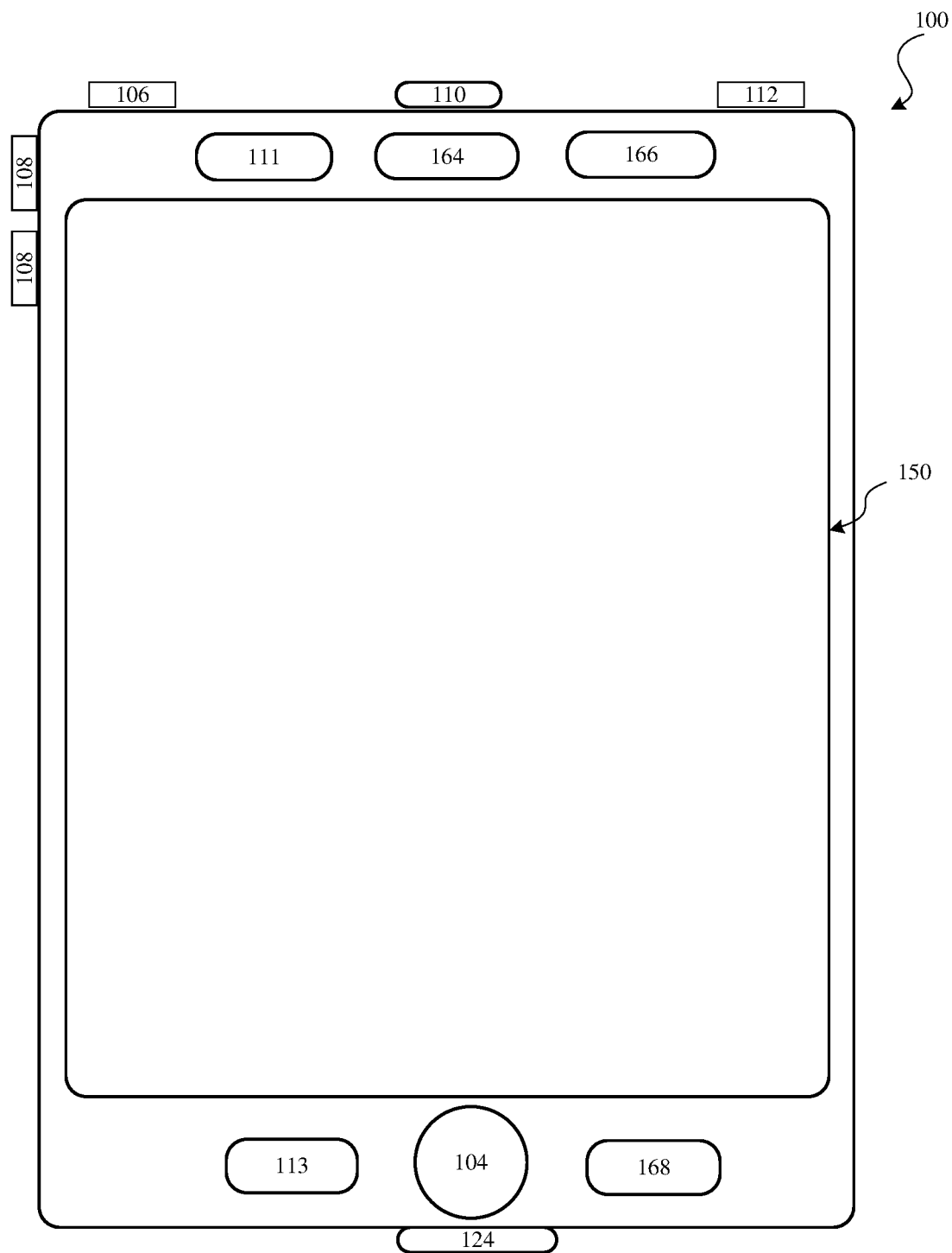
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
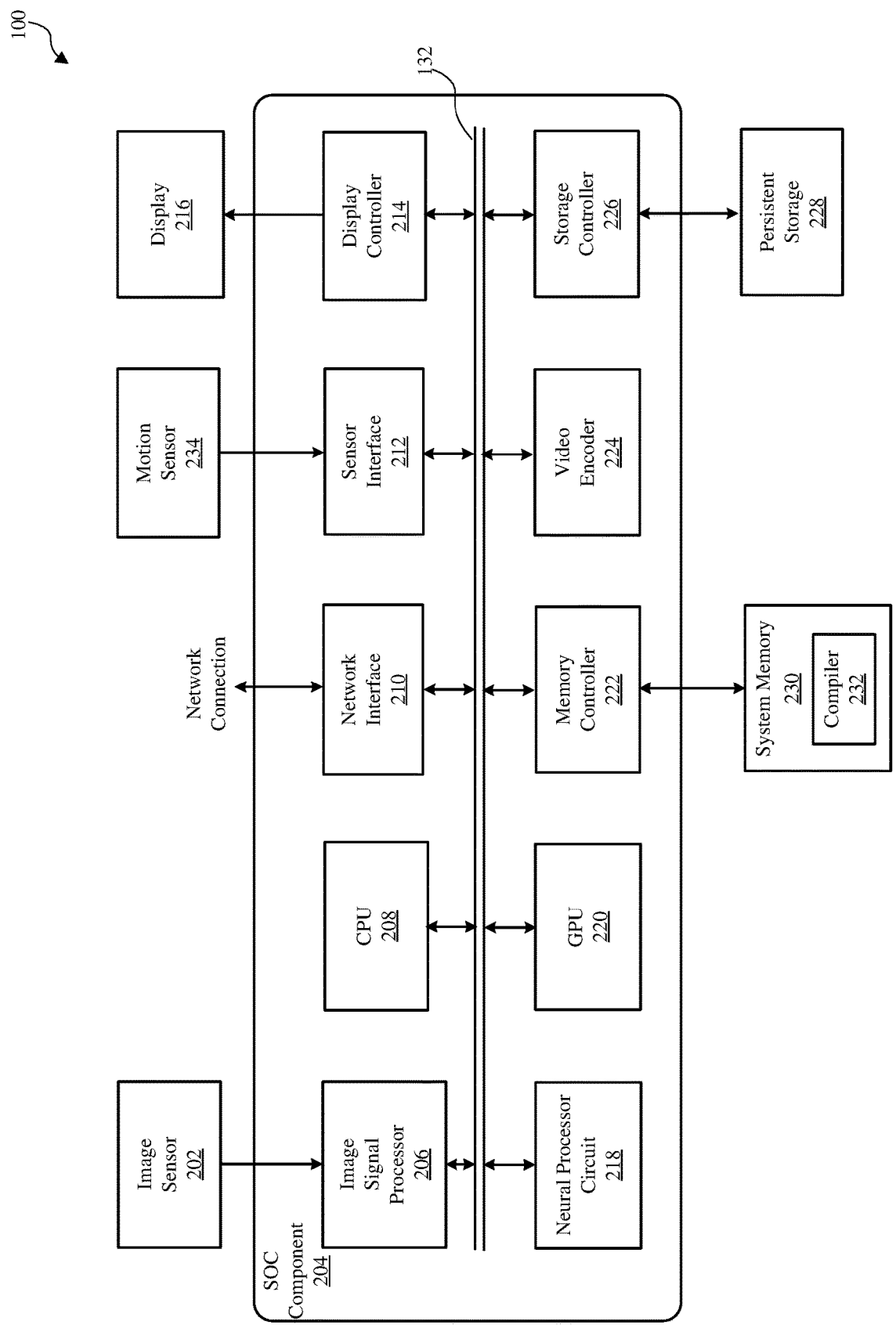
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion (orientation) sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats. In one embodiment, system memory 230 includes a compiler 232. The compiler 232 is architected to reduce data fetch and read operations between a neural processor circuit 218 and system memory 230, as will be further described below.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, addition and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 302, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
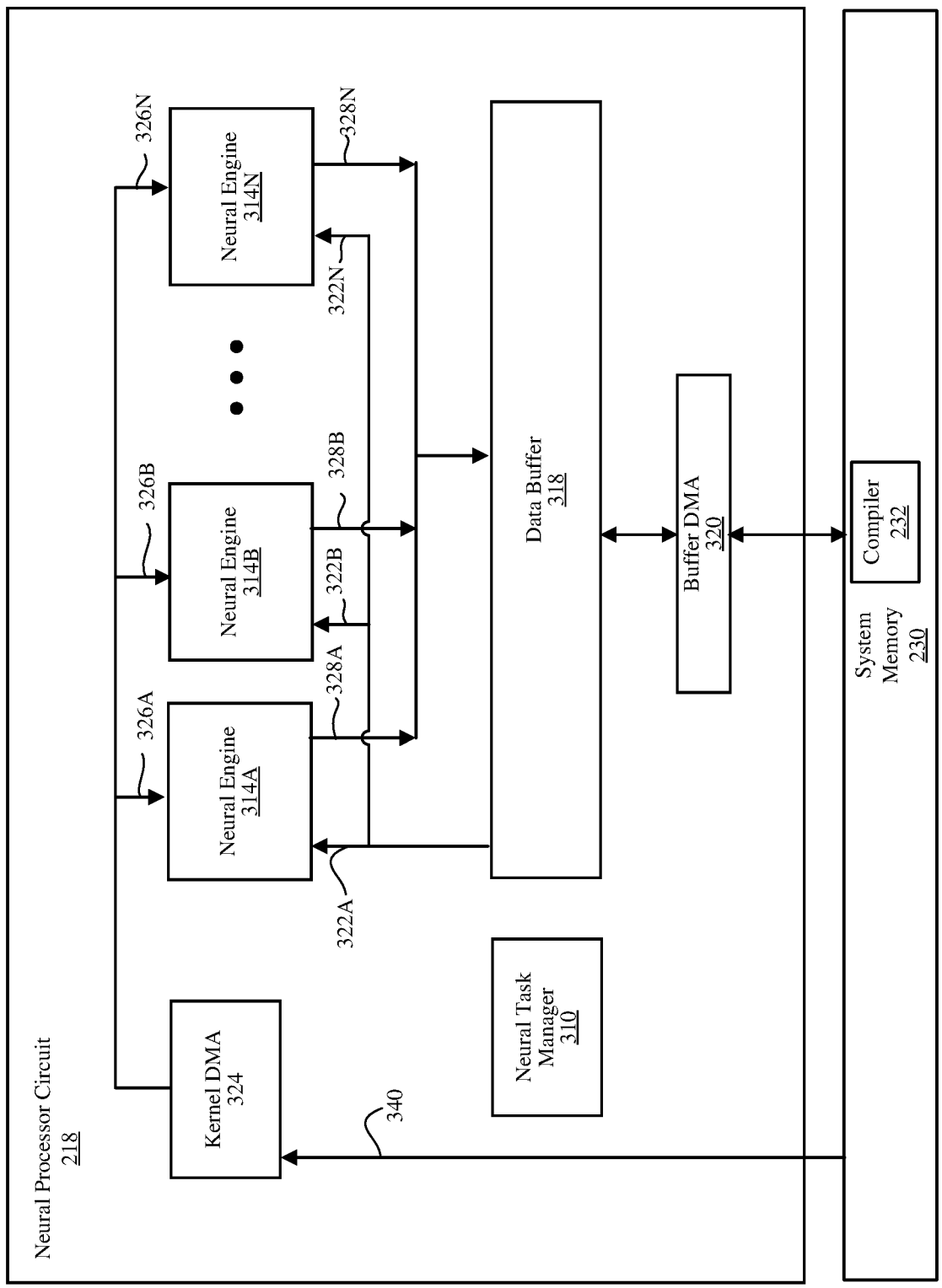
FIG. 3 is a block diagram illustrating a neural processor circuit, according to one embodiment.

Neural task manager 310 manages the overall operation of neural processor circuit 218. Neural task manager 310 may receive a task list from the compiler 232 executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel information from a source (e.g., system memory 230) and sends kernel information 326A through 326N to each of the neural engines 314. Kernel information represents information from which kernel elements can be extracted. In one embodiment, the kernel information may be in a compressed format which is decompressed at each of neural engines 314. Although kernel information provided to each of neural engines 314 may be the same in some instances, the kernel information provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where input data of all input channels are fed to all neural engines 314 or in a unicast mode where data input data of a subset of input channels are fed to each neural engine 314.

The input data 322 stored in data buffer 318 can be part of, among others, image data, histogram of oriented gradients (HOG) data, audio data, meta data, output data 328 of a previous cycle of the neural engine 318, and other processed data received from other components of the SOC component 204.

Buffer DMA 320 includes a read circuit that receives a portion (e.g., tile) of the input data from a source (e.g., system memory 230) for storing in data buffer 318, and a write circuit that forwards data from data buffer 138 to a target (e.g., system memory).

Example Neural Engine Architecture

Figure 4:
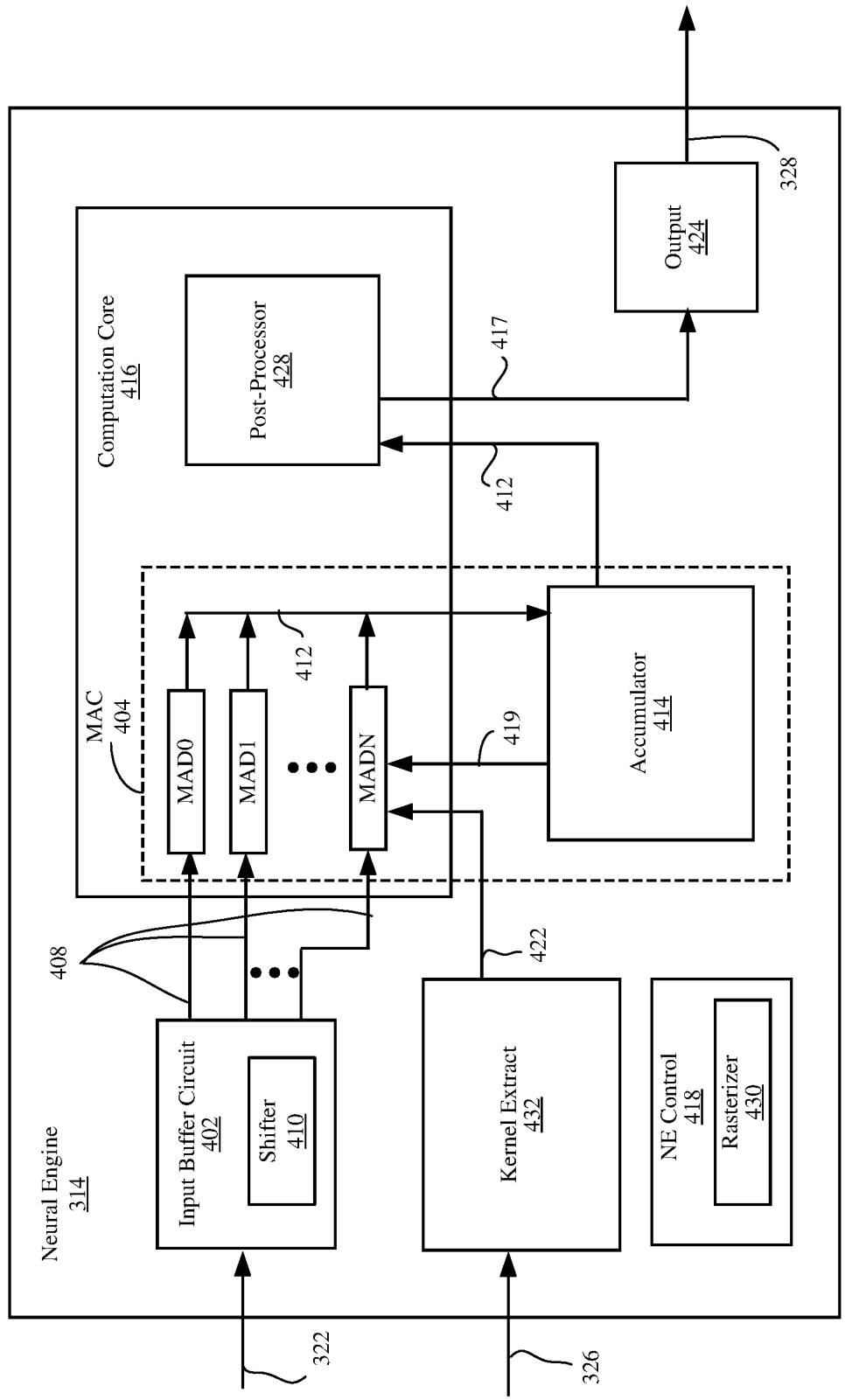
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling and local response normalization. The neural engine 314 receives the input data 322, performs multiply-accumulate operations (e.g., convolution operations) on the input data 322 based on stored kernel information, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of difference convolution groups and/or input channels.

Kernel extract circuit 432 is a circuit that receives kernel information 326 from kernel DMA 324 and extracts kernel coefficients 422. In one embodiment, the kernel extract circuit 432 references a look up table (LUT) and uses a mask to reconstruct a kernel from compressed kernel information 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel information in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying non-linear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAC circuits, and perform different types of post-processing operations at post processor 428. To configure components of the neural engine 314 to operate in a desired manner, the NE control 418 sends a control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out as output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/selection of post-processing operations at the post processor 428.

Operation of Segmenting of Data for Processing at Neural Processor Circuit

Input data is typically split into smaller pieces of data for parallel processing at multiple neural engines 314. Often multiple cycles of operations are performed to generate output for a task associated with a neural network. The compiler 232 executed by CPU 208 analyzes the hierarchy and layers of the neural network and determines how the input data is to be segmented based on the hardware constraints of the neural processor circuit 218. One of functions of the compiler 232 is to determine how input data is to be split into smaller data units for processing at the neural engines 314, and how the processing is to be iterated in loops to produce the result for tasks.

Figure 5:
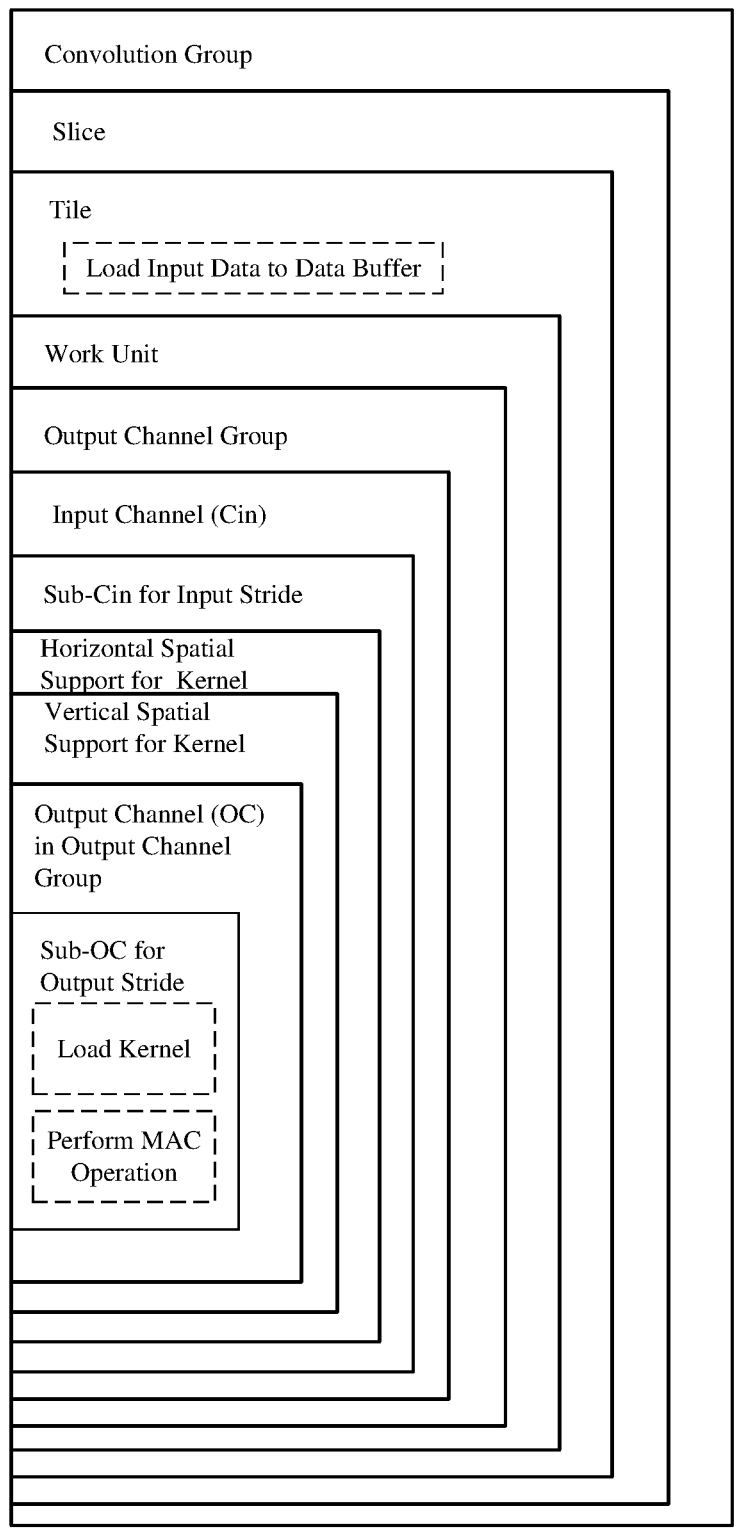
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
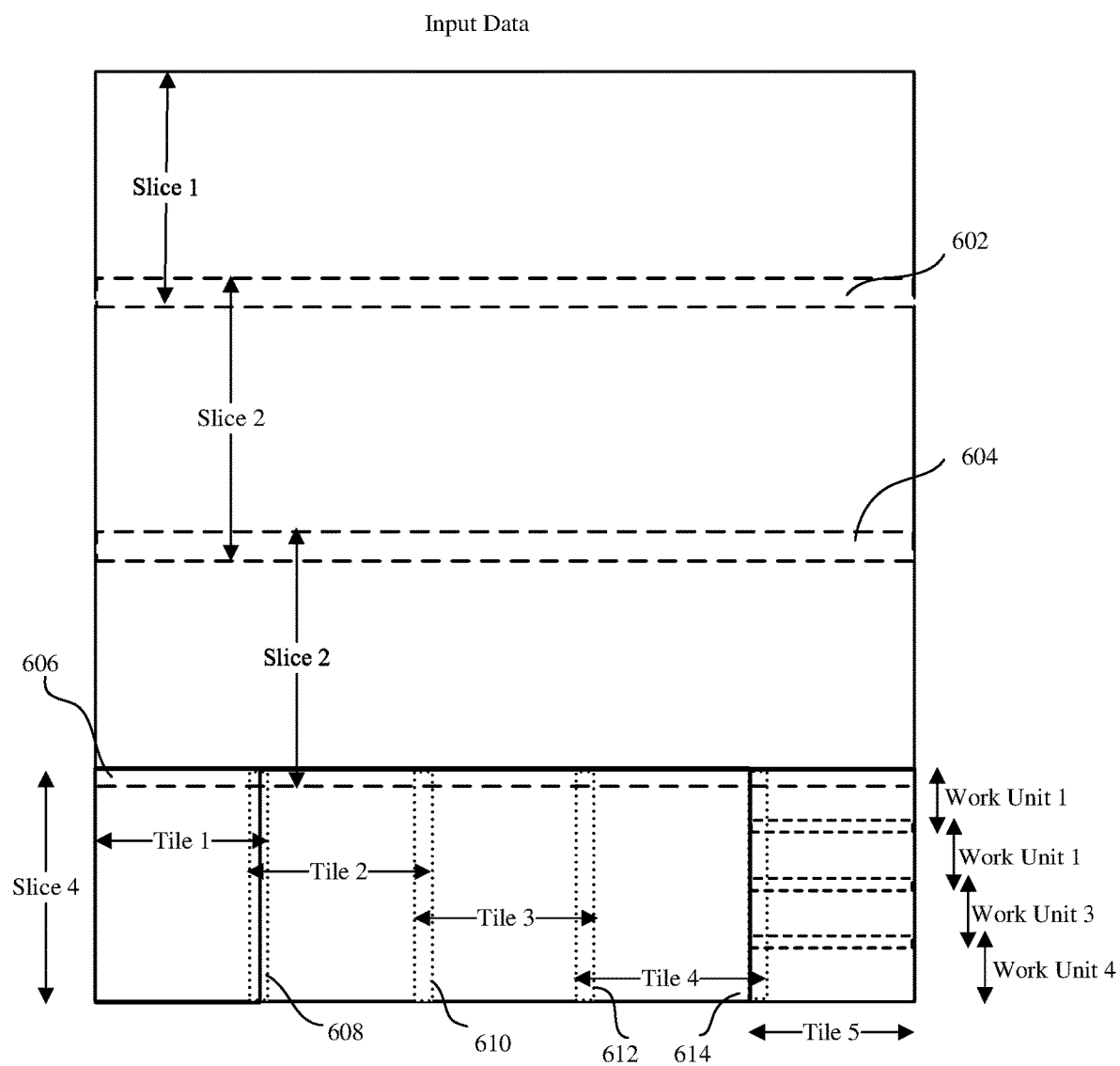
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched data to provide support for a corresponding kernel.

Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 606, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

Figure 7:
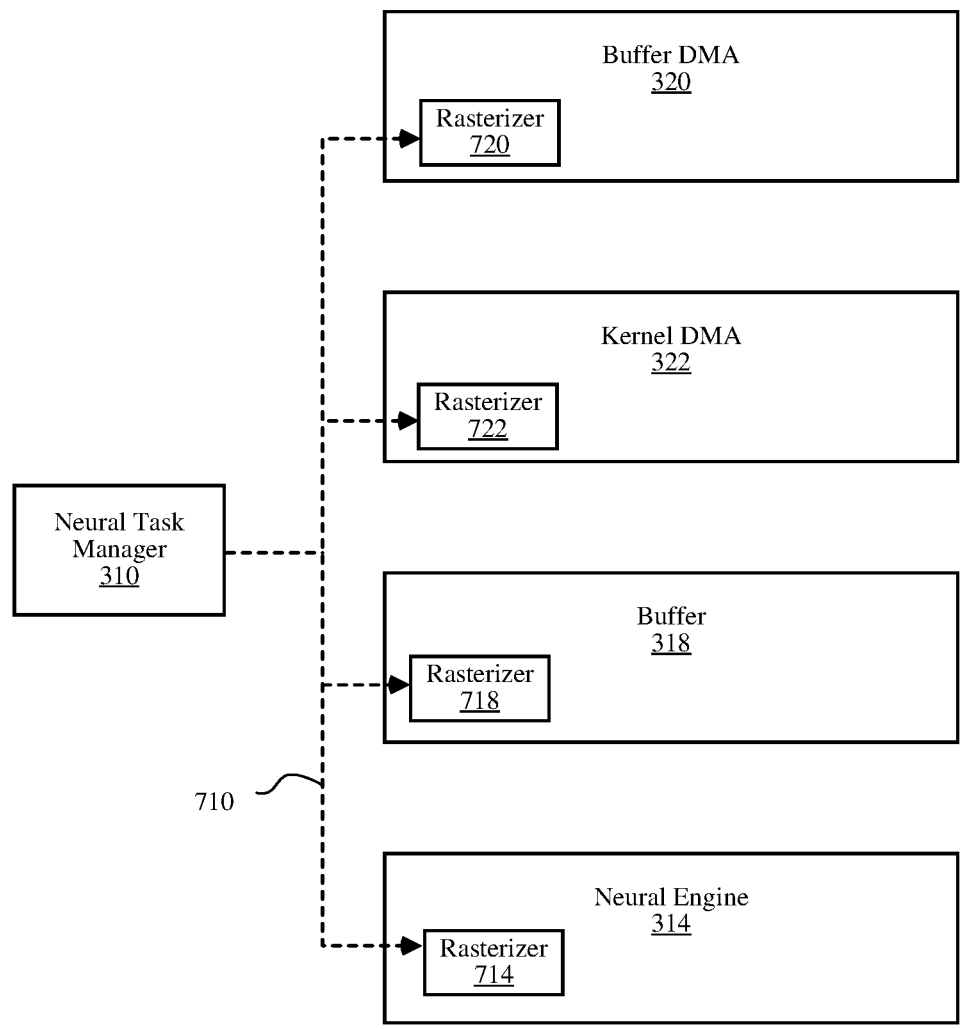
FIG. 7 is a diagram illustrating programming of rasterizers in components of the neural processor circuit, according to one embodiment.

In one or more embodiments, the operations associated dividing the input space into smaller units and processing these smaller units as described above with reference to FIGS. 5 and 6 are performed by rasterizers 714, 718, 720, 722 in various components of neural processor circuit 218 as shown in FIG. 7. A rasterizer is a circuit in various components of neural processor circuit 218 that keeps track of the segment of the input/output data (e.g., group, work unit, input channel, output channel) and instructs the components of neural processor circuit 218 for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 724 in kernel DMA 322 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

FIG. 7 is a diagram illustrating programming of rasterizers 714, 718, 720, 722 in components 314, 318, 320, 322 of the neural processor circuit 218, according to one embodiment. To perform their functions, each of rasterizers 714, 718, 720, 722 receives task information 710 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
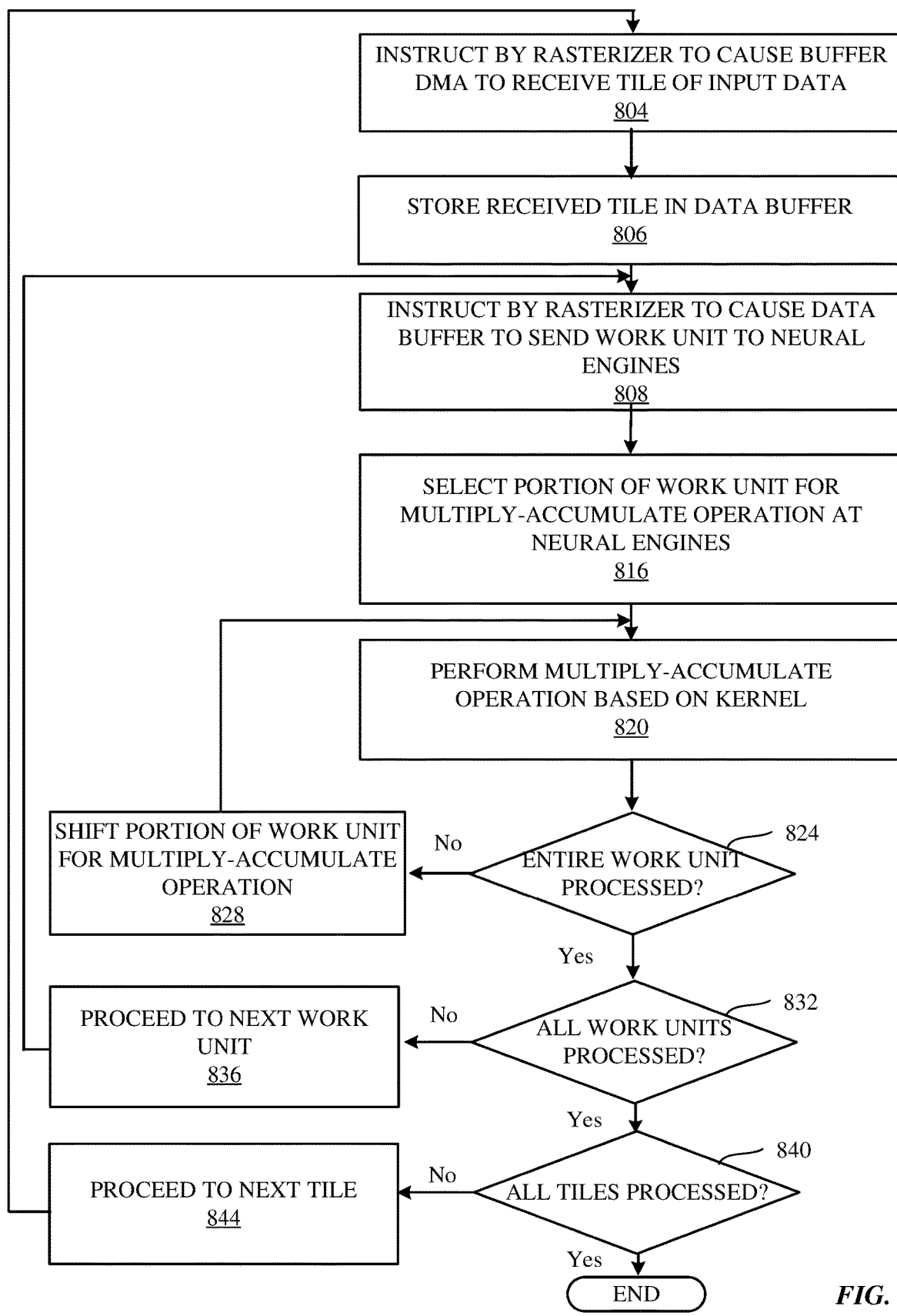
FIG. 8 is a flowchart illustrating a method of processing input data in a neural processor circuit, according to one embodiment.

FIG. 8 is a flowchart illustrating a method of processing input data in neural processor circuit 218, according to one embodiment. After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Example Architecture of Compiler

Figure 9:
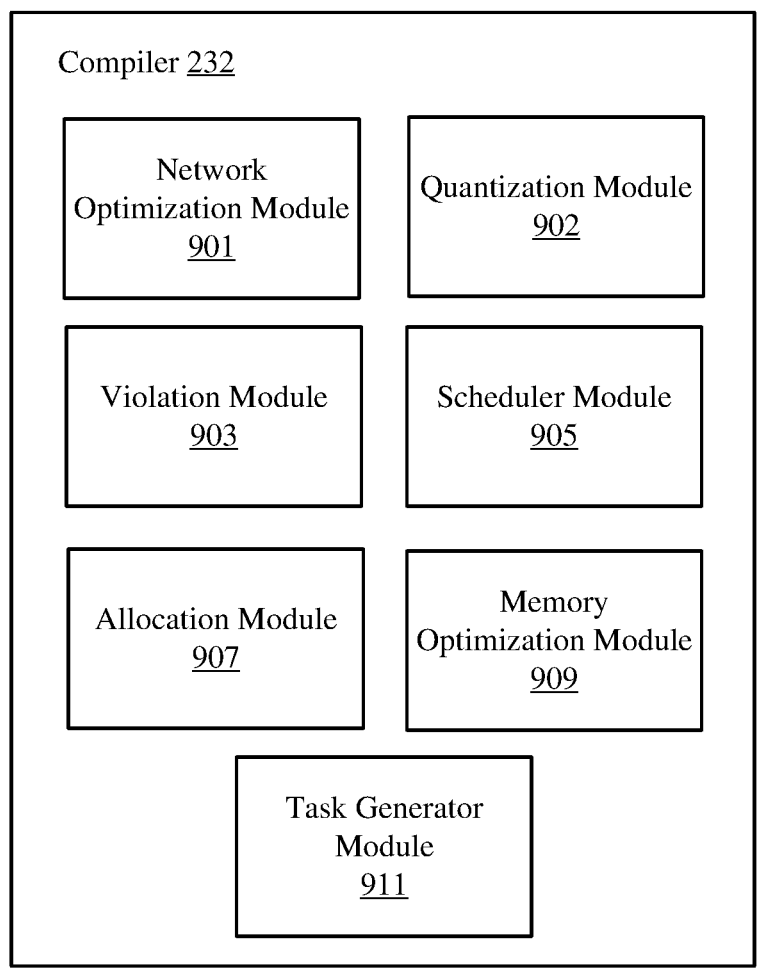
FIG. 9 is a block diagram of a compiler, according to one embodiment.

FIG. 9 is a block diagram illustrating a detailed view of the compiler 232, according to one embodiment. The compiler 232 is a software module that receives information about a neural network and generates task descriptors corresponding to tasks that are executed by the neural processor circuit 218 to implement the neural network. To convert the neural network to one or more tasks executable on the neural processor circuit 218, the compiler 232 takes into account, among others, hardware restrictions and capabilities of components in the neural processor circuit 218 and one or more restrictions on tasks imposed by users. Although FIG. 2 illustrates the compiler 232 as being instantiated in a system memory 230 of the electronic device 100, the compiler 232 may be instantiated on other memory components. Furthermore, the compiler 232 may be instantiated on and executed by a computing device distinct from the electronic device 100. In such case, the task descriptors may be generated by the computing device and be sent to the electronic device 100 to embody the neural network.

The compiler 232 may include, among other software components, a network optimization module 901, a quantization module 902, a violation module 903, a scheduler module 905, an allocation module 907, a memory optimization module 909, and a task generator module 911. In other embodiments, the compiler 232 may include other modules in addition to those illustrated in FIG. 9. One or more components of the compiler may be embodied as dedicated hardware circuit or a combination of dedicated hardware and software.

The network optimization module 901 is a software module or a hardware module that performs various optimizations on a neural network to be embodied by the neural processor circuit 218. After the neural network is loaded onto the compiler 232, the network optimization module 901 loads the neural network for implementing on the neural processor circuit 218. The neural network may be a deep neural network (DNN), ANN, CNN, RNN, or a DBN or any combination thereof, and may be represented in a directed acyclic graph (DAG). The network optimization module 901 may also receive information on range of values in the input data, example input data and other information associated with kernel or input data of the neural network.

The network optimizations performed by the network optimization module 901 include, among others, converting a generic DAG corresponding to the neural network to a DAG of tasks specific to or configured for processing by the neural processor circuit 218. In doing so, the network optimization module 901 takes into account the hardware capabilities and restrictions of the neural processor circuit 218 and/or its components. The conversion of the DAG may include combining multiple layers of the generic DAG into a single task in the converted DAG, or splitting up a single layer in the generic DAG into multiple tasks in the converted DAG, depending on the nature of the tasks and capabilities of the neural processor circuit 218.

Figure 10:
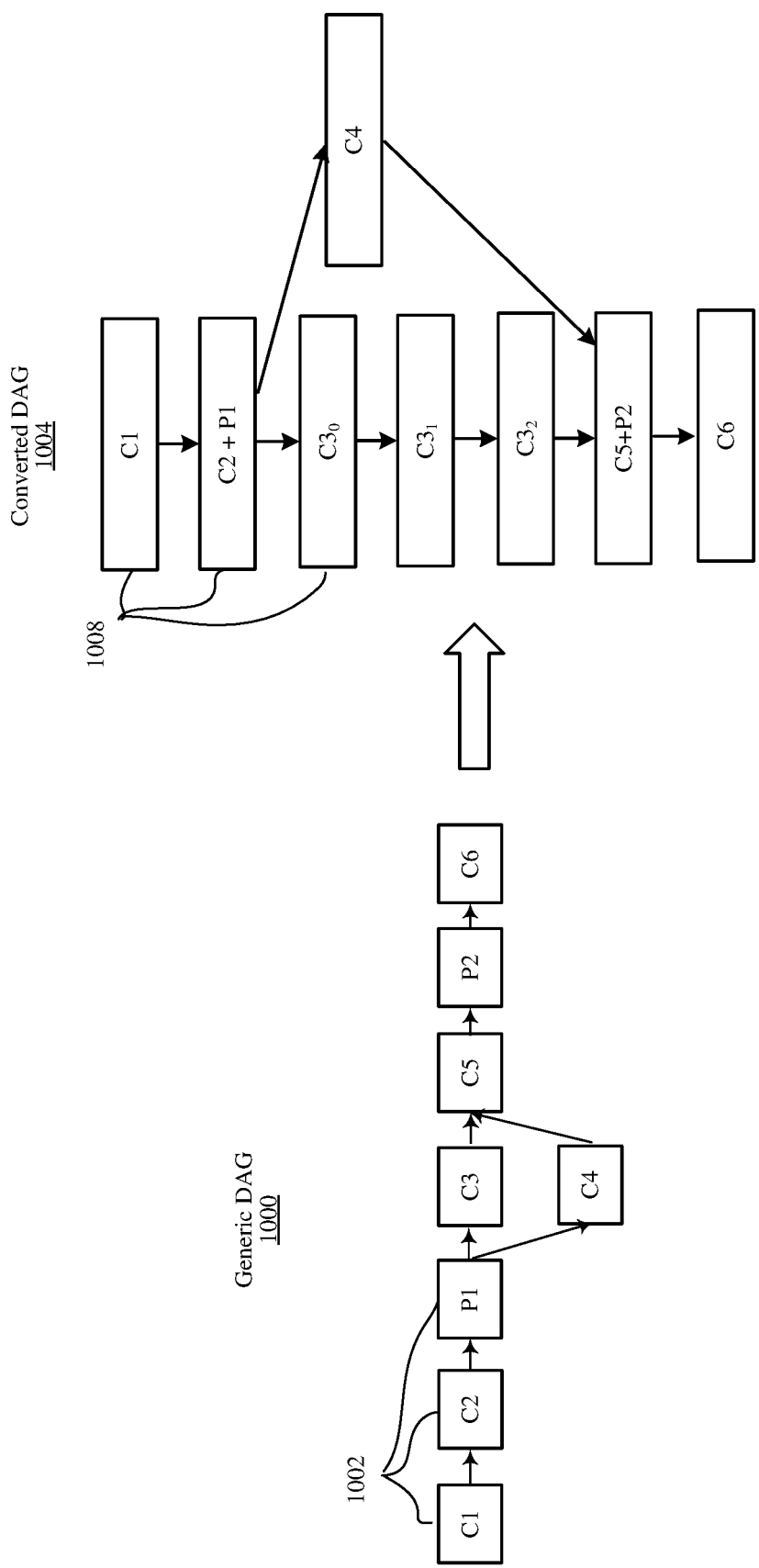
FIG. 10 is a block diagram illustrating a neural network represented by a list of tasks, according to one embodiment.

Referring to FIG. 10, a conceptual diagram of converting a generic DAG 1000 to a neural processor specific DAG 1004 is illustrated. Generic DAG 1000 includes 7 different layers 1002 of processing connected by arrows representing flow of data. The generic DAG 1000 represents a neural network that is not specific to or confined to the neural processor circuit 218. In contrast, the converted DAG 1004 includes tasks 1008 that can be processed by the neural processor circuit 218. The layers 1002 and the tasks 1008 may have one-to-one correspondence, but not always so. As a result of the optimization process, the network optimization module 901 produces the converted DAG. In one embodiment, the optimization process also results in a network that is functionally equivalent to the original network. That is, the output of the converted DAG matches the output of the original network within the bounds of quantization errors.

For example, because a neural engine 314 of the neural processor circuit 218 has MAC 404 for performing convolution operations and a post processor 418 for performing post-processing operations, the network optimization module 901 may collapse a C2 layer of the generic DAG 1000 and P1 post-processing layer (e.g., ReLU) into a single task (C2+P1) in the converted DAG 1004. Conversely, a C3 layer of the generic DAG 1000 may not be appropriate for a single task in the network processor circuit 218 due to reasons such as large kernel data size or large input data size. In such case, the C3 layer of the generic DAG 1000 may be converted to three separate tasks $C3_0$, $C3_1$ and $C3_2$, as shown in FIG. 10.

The network optimization module 901 may also combine a group of multiple convolution tasks that satisfy constraints into a single group-convolution task. Grouping multiple convolution tasks into a single group-convolution task allows for efficient processing of the convolutions tasks by the neural processor circuit 218.

The network optimization module 901 may also transform operations that are not directly supported by neural processor circuit 218 into mathematically equivalent operations that are supported by the neural processor circuit 218. For example, dilated convolutions are not directly supported by the neural processor circuit 218. However, the network optimization module 901 transforms dilated convolutions into a regular convolution with a sparse kernel (by inserting zeros between non-zero kernel values), which is supported relatively efficiently on neural processor circuit 218 where the neural processor circuit 218 ignores the majority of the inserted zeros. In one embodiment, the network optimization module 901 may perform operations to reduce overall latency, or latency of a specific branch of tasks, overall energy, or reduce peak power consumption.

Referring back to FIG. 9, the quantization module 902 produces the quantized versions of values or produces quantization parameters of other values for quantization during the runtime of the neural processor circuit 218. The values to be quantized by the quantization module 902 includes, among others, kernel coefficients (or palletized representative coefficients) and convolution bias. These values are known during the compilation before the runtime, and hence, quantized versions of these values can be produced by the quantization module 902 during the compilation process. Conversely, input data, intermediate data, and output data may not be known until the neural processor circuit 218 starts operation, and hence, the quantization module 902 produces quantization parameters for quantizing these values during runtime. The quantization parameters (e.g., scale and offset) are included as part of the task descriptor.

The violation module 903 is a software module or a hardware module that analyzes the results from the network optimization module 901 for any violations, and fixes them. The violations may relate to the hardware constraints for processing input data or kernels. For example, if the size of the input data or kernels associated with a task in the converted DAG is too large, the task may be split into sub-tasks, a kernel data that is larger than a threshold size may be split into smaller kernel data units. The violation module 903 may also detect violations related to a specific mode of the neural processor circuit 218 (e.g., splitting up a task for a batch mode in which different parts of the input data are processed by the same kernel data). If any corrections are made in the violation module 903, the corrected versions of the converted DAG, the quantization parameters and quantized kernel coefficients are produced by the violation module 903.

The scheduler module 905 is a software module or a hardware module that determines the schedule of tasks related to the converted DAG. Generally, a neural network may include network layers or sub-layers that are implemented as a series of tasks executed by the neural processor circuit 218. The scheduler module 905 determines the order of tasks as described in the converted DAG generated by the network optimization module 901. In order to determine the schedule, the scheduler module 905 may traverse certain paths of the converted DAG to determine the order of tasks. Referring back to FIG. 10, for example, the scheduler 905 may decide to perform task C4 followed by tasks $C3_0$ through $C3_2$ or vice versa based on, for example, a bandwidth requirement of tasks in each branch. If shared input data is non-resident and will be stored in the data buffer 318 by a first branch, it is beneficial to schedule tasks that are compute bound rather than bandwidth bound. In one embodiment, the scheduler module 905 may delay the scheduling of tasks to reduce the peak short time power.

In one embodiment, the allocation module 907 is a software module or a hardware module that determines how the input data is to be segmented into slices, tiles and work units. That is, the allocation module 907 determines the shapes and dimensions of slices, tiles and work units to be segmented by rasterizers 714, 718, 722 and 720.

The allocation module 907 also determines how to allocate memory space of the data buffer 318 or the system memory 230 for performing the tasks. The allocation module 907 determines the memory space in the data buffer 318 for storing a tile of input data, intermediate data generated in a previous cycle of neural engines 314 for further processing in a subsequent cycle of neural engines, and slice of output data resulting from the processing at neural engines 314. In one embodiment, the allocation module 907 prioritizes storing data in and retrieving data from the data buffer 318 instead of system memory 230 to reduce the time, power, and data transfer bandwidth associated with providing the input data to the neural engines 314. By storing the input data in the data buffer 318, the input data is local to the neural engines 314 compared to if the input data were stored in the system memory 230 resulting in less power consumption and improved processing time of the input data.

As described above with reference to FIG. 6, input data is typically split into smaller pieces of data for parallel processing at multiple neural engines 314. The allocation module 907 analyzes the hierarchy and layers of the neural network and determines how the input data is to be segmented based on the hardware constraints of the neural processor circuit 218. One of functions of the allocation module 907 is to determine how input data is to be split into slices and then split into tiles for storing in the data buffer 318 so that a segment of input data for processing can be retrieved by the neural engines 314.

Figure 11:
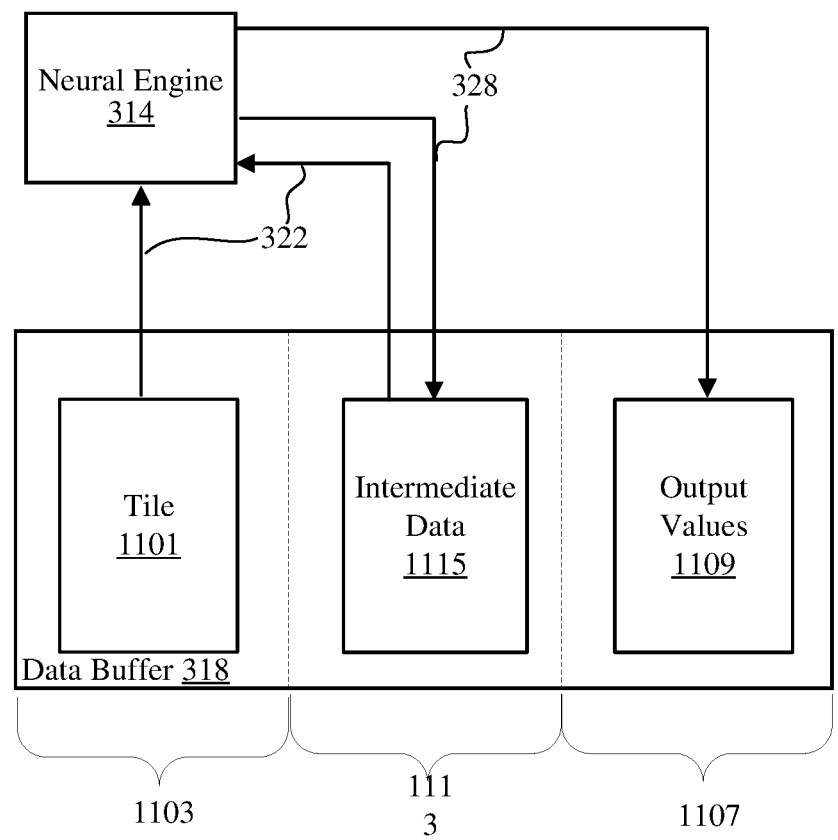
FIG. 11 is a diagram illustrating allocation of memory space of a data buffer in the neural processor circuit, according to one embodiment.

In one embodiment, the allocation module 907 allocates a portion of the data buffer 318 to store a tile of the input data. For example, FIG. 11 illustrates storing tile 1101 in first memory space 1103 of the data buffer 318. The tile 1101 is received, for example, from the system memory 230 via a DMA process and stored in the data buffer 318 until the processing of the tile 1101 is completed. A portion of the tile 1103 (e.g., a work unit) is transmitted to a neural engine 314 and processed by the neural engine 314 during a single cycle of the neural engine 314.

The allocation module 907 also allocates a portion of the data buffer 318 to store output values generated by a neural engine 314 in response to processing a work unit of the input data at the neural engine 314. The processing of the work unit may be performed in a single processing cycle or across multiple processing cycles. For example, FIG. 11 illustrates allocating memory space 1107 of the data buffer 318 to store output values 1109 generated by the neural engine 314. The output values stored in the data buffer 318 are then stored in system memory 230.

In one embodiment, the allocation module 901 also allocates a portion of the data buffer 318 to store intermediate data. In one embodiment, intermediate data is data generated at neural engine 314 during one processing cycle for processing by neural engine 314 in a subsequent processing cycle. For example, FIG. 11 illustrates allocating memory space 1113 of the data buffer 318 to store intermediate data 1115 output by neural engine 314 during a processing cycle. The intermediate data 1115 is transmitted back to neural engine 314 for further processing during a subsequent processing cycle.

The memory optimization module 909 is a software module or a hardware module that performs various memory related optimization operations associated with the neural processor circuit 218. As part of the memory optimization, memory manipulation operations (e.g., splitting and concatenation) may be collapsed into its surrounding operations (which themselves may be memory manipulation operations or computation operations). This is possible because the neural network processor circuit 218's DMA 324 are capable of accessing a slice of a tensor both when reading and writing to the data buffer 318.

In one embodiment, slicing describes accessing subranges of certain dimensions, possibly with strides. Slicing lacks any cost (e.g., is computationally free) when performed as part of a computation operation, whereas slicing would incur a large overhead if it is performed as a standalone memory manipulation operation. The memory optimization module 909 is able to eliminate most of the standalone memory manipulation operations in typical DNN DAGs.

In one embodiment, the memory optimization module 909 also provides information for performing efficient caching operation at a memory device (e.g., a cache device) between the system memory 230 and the neural network processor circuit 218. The memory optimization module 909 generates the cache information based on the characteristics of the input data such as the size and shape of the input data. The cache information is part of the task descriptors and is communicated to the DMA 324 by the neural task manager 310. Based on the cache information, the DMA 324 annotates each individual memory transaction request with a "cache hint" field. Upon receiving a memory request, the system cache, which is located between the neural processor circuit 218 and the system memory 230, will use a different caching policy based on the request's cache hint field. As a result, a determination can be made as to data that is allocated to the system cache and data that is not allocated to the system cache. Since the system cache is a limited system-wide resource, data that is to be allocated to system cache is prioritized. In one embodiment, cache hints are optimized to minimize power (prioritize data that is accessed frequently) or maximize performance (prioritize data that needs to be accessed quickly). Note that system cache has an order of magnitude higher bandwidth and order of magnitude lower power when compared to the system memory 230.

The task generator module 911 is a software module or a hardware module that assembles task descriptors corresponding to the tasks in the converted DAG. A task descriptor defines a configuration of components in the neural processor circuit 218 to execute the task associated with the task descriptor. Each task descriptor for a task comprises a task descriptor header and configuration registers. The task descriptor header comprises configurations related to the task manager behavior for the task. In one embodiment, the task descriptor header comprises 28 or 32 Bytes and is written at the beginning of each task descriptor. The task descriptor header includes a plurality of fields. The fields include a task ID, a network ID, an estimated number of cycles required to execute the task to execute, and indications of the allocations memory of the data buffer 318 etc. The fields may also include task-switch enable (TSE), task-switch ready (TSR), destination pointer change (DPC), source pointer change (SPC), and source pointer last (SPL). The compiler 232 may specify task switch behavior based on the fields in the task descriptor header comprising TSE, TSR, DPC, SPC, and SPL.

In one embodiment, the task configuration registers indicate values to be set in registers of the components of the neural processor circuit 218 to perform the related task. The task configuration registers include a plurality of fields. The fields include a register address indicative of the address of the register to write, a field that describes the number of consecutive registers to be written using auto-increment of the address in the register address field, and register data describing the payload to write.

The task descriptors, after being assembled by the task generator module 911, are sent to the neural task manager 310 to set the operations of the neural task manager 310 and other components of the neural processor circuit 218.

The task generator module 911 may also compile kernel binary. The task generator module 911 prepares kernel coefficients in the order that the neural processor circuit 218 will consume the kernel coefficients and packs the kernel coefficients into a binary blob.

Example Process of the Compiler

Figure 12:
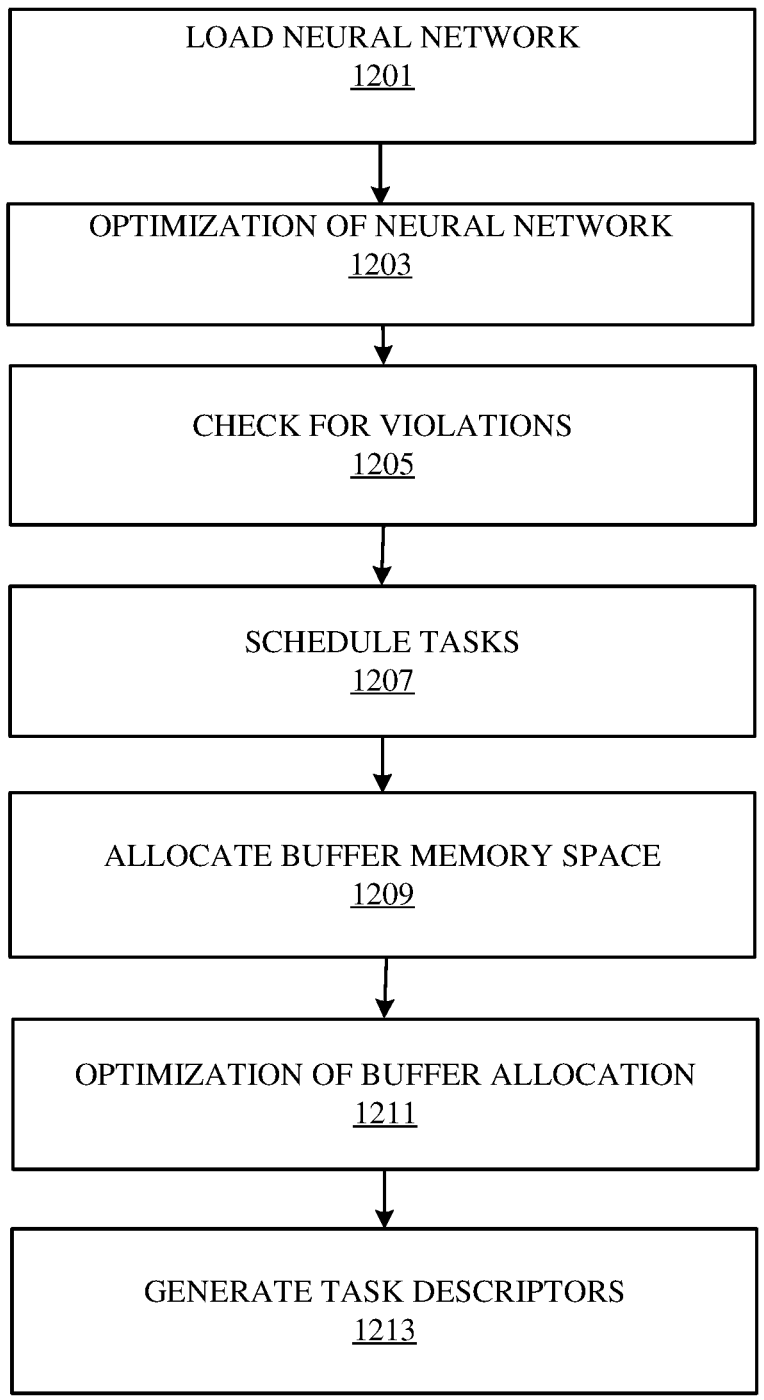
FIG. 12 is a flowchart illustrating a method of the compiler, according to one embodiment.

FIG. 12 is a flowchart illustrating a method of the compiler 232, according to one embodiment. The compiler 232 loads 1201 the neural network. The neural network may be a DNN, ANN, CNN, RNN, DBN, or any combination thereof and may be represented by a DAG. The compiler 232 performs 1203 network related optimizations of the neural network. The network related optimizations include for example converting the generic DAG corresponding to the neural network to a DAG of tasks specific to or configured for processing by the neural processor circuit 218. The conversion of the DAG may include combining multiple layers of the generic DAG into a single task in the converted DAG, or splitting up a single layer in the generic DAG into multiple tasks in the converted DAG, depending on the nature of the tasks and capabilities of the neural processor circuit 218. Thus, the compiler 232 accounts for the hardware capabilities and restrictions of the neural processor circuit 218. The compiler 232 may also determine quantization parameters for values stored in the neural processor circuit 218.

The compiler 232 then checks 1205 the optimizations for any violations and fixes any identified violations. The violations may relate to the hardware constraints for processing input data or kernels. After violations have been corrected, the compiler schedules 1207 tasks to be performed by the neural processor circuit 218. The compiler 232 determines the order of tasks as described in the converted DAG by traversing certain paths of the converted DAG.

The compiler 232 allocates buffer memory spaces of the memory buffer within the neural processor circuit 218 to input data related to the tasks. Specifically, the compiler 232 determines the memory space in the data buffer 318 for storing a tile of input data, intermediate data generated in a previous cycle of neural engines 314 for further processing in a subsequent cycle of neural engines, and slice of output data resulting from the processing at neural engines 314. The buffer allocations may be optimized 1211 by the compiler 232. For example, the compiler 232 determines the shapes and dimensions of slices, tiles and work units to be segmented by rasterizers 714, 718, 722 and 720. The optimizations further include providing information for performing efficient caching operation at a cache device between the system memory 230 and the neural network processor circuit 218. The compiler 232 next generates 1213 task descriptors corresponding to the tasks in the converted DAG. A task descriptor defines a configuration of components in the neural processor circuit 218 to execute the task associated with the task descriptor.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of compiling operations for a neural network processor circuit, the method comprising:
analyzing, by a compiler, characteristics of input data and a neural network to be processed by the neural network processor circuit;
allocating, by the compiler and based on the characteristics of the input data and the neural network, a first memory portion of a data buffer in a neural network processor circuit for storing a portion of the input data received from a memory external to the neural network processor circuit, wherein work units are derived from the portion of the input data and provided to neural engine circuits of the neural network processor circuit to perform neural network operations on the work units using one or more kernels;
allocating, by the compiler and based on the characteristics of the input data and the neural network, a second memory portion of the data buffer in the neural network processor circuit for storing output values generated at the neural engine circuits of the neural network processor circuit before storing in the memory external to the neural network processor circuit; and
allocating, by the compiler and based on the characteristics of the input data and the neural network, a third memory portion of the data buffer in the neural network processor circuit to store intermediate data generated at the neural engine circuits of the neural network processor circuit in a first processing cycle by performing the neural network operations and provided to the neural engine circuits of the neural network processor circuit in a second processing cycle subsequent to the first processing cycle to generate subsequent intermediate data or the output values generated at the neural engine circuits of the neural network processor circuit.

2. The method of claim 1, further comprising:
generating cache information for sending to a cache device between the neural network processor circuit and the memory external to the neural network processor circuit based on the characteristics of the input data and the neural network, the cache information enhancing efficiency of a caching operation associated with sending the input data from the memory external to the neural network processor circuit to the data buffer in the neural network processor circuit.

3. The method of claim 1, further comprising:
generating task descriptors for sending to a neural task manager of the neural network processor circuit, the task descriptors indicating at least the allocations of the first memory portion, the second memory portion, and the third memory portion of the data buffer in the neural network processor circuit.

4. The method of claim 1, further comprising:
receiving a directed acyclic graph (DAG) representing layers of the neural network in a manner that is agnostic to the neural network processor circuit;
generating a converted DAG representing tasks for implementing the neural network in a manner that is specific to the neural network processor circuit; and
determining a sequence of tasks to be performed in the neural network processor circuit.

5. The method of claim 1, further comprising:
determining quantization parameters associated with coefficients of the one or more kernels, the input data, the intermediate data generated at the neural engine circuits of the neural network processor circuit, and the output values generated at the neural engine circuits of the neural network processor circuit.

6. The method of claim 5, further comprising
correcting violations associated with quantization of the coefficients of the one or more kernels, the input data, the intermediate data generated at the neural engine circuits of the neural network processor circuit, and the output values generated at the neural engine circuits of the neural network processor circuit exceeding hardware capabilities of the neural network processor circuit.

7. The method of claim 6, wherein correcting the violations associated with the quantization of the coefficients comprises dividing a task into a plurality of tasks.

8. A non-transitory computer readable storage medium storing executable code for compiling operations for a neural network processor circuit, the executable code when executed by a computer processor cause the computer processor to perform steps comprising:
analyzing, by a compiler, characteristics of input data and a neural network to be processed by the neural network processor circuit;

allocating, by the compiler and based on the characteristics of the input data and the neural network, a first memory portion of a data buffer in a neural network processor circuit for storing a portion of the input data received from a memory external to the neural network processor circuit, wherein work units are derived from the portion of the input data and provided to neural engine circuits of the neural network processor circuit to perform neural network operations on the work units using one or more kernels;

allocating, by the compiler and based on the characteristics of the input data and the neural network, a second memory portion of the data buffer in the neural network processor circuit for storing output values generated at the neural engine circuits of the neural network processor circuit before storing in the memory external to the neural network processor circuit; and allocating, by the compiler and based on the characteristics of the input data and the neural network, a third memory portion of the data buffer in the neural network processor circuit to store intermediate data generated at the neural engine circuits of the neural network processor circuit in a first processing cycle by performing the neural network operations and provided to the neural engine circuits of the neural network processor circuit in a second processing cycle subsequent to the first processing cycle to generate subsequent intermediate data or the output values generated at the neural engine circuits of the neural network processor circuit.

9. The non-transitory computer readable storage medium of claim 8, wherein the executable code when executed by the computer processor further causes the computer processor to perform steps comprising:

generating cache information for sending to a cache device between the neural network processor circuit and the memory external to the neural network processor circuit based on the characteristics of the input data and the neural network, the cache information enhancing efficiency of a caching operation associated with sending the input data from the memory external to the neural network processor circuit to the data buffer in the neural network processor circuit.

10. The non-transitory computer readable storage medium of claim 8, wherein the executable code when executed by the computer processor further causes the computer processor to perform steps comprising:

generating task descriptors for sending to a neural task manager of the neural network processor circuit, the task descriptors indicating at least the allocations of the first memory portion, the second memory portion, and the third memory portion of the data buffer in the neural network processor circuit.

11. The non-transitory computer readable storage medium of claim 8, wherein the executable code when executed by the computer processor further causes the computer processor to perform steps comprising:

receiving a directed acyclic graph (DAG) representing layers of the neural network in a manner that is agnostic to the neural network processor circuit;

generating a converted DAG representing tasks for implementing the neural network in a manner that is specific to the neural network processor circuit; and determining a sequence of tasks to be performed in the neural network processor circuit.

12. The non-transitory computer readable storage medium of claim 8, wherein the executable code when executed by the computer processor further causes the computer processor to perform steps comprising:

determining quantization parameters associated with coefficients of the one or more kernels, the input data, the intermediate data generated at the neural engine circuits of the neural network processor circuit, and the output values generated at the neural engine circuits of the neural network processor circuit.

13. The non-transitory computer readable storage medium of claim 12, wherein the executable code when executed by the computer processor further causes the computer processor to perform steps comprising:

correcting violations associated with quantization of the coefficients of the one or more kernels, the input data, the intermediate data generated at the neural engine circuits of the neural network processor circuit, and the output values generated at the neural engine circuits of the neural network processor circuit exceeding hardware capabilities of the neural network processor circuit.

14. The non-transitory computer readable storage medium of claim 13, wherein correcting the violations associated with the quantization of the coefficients comprises dividing a task into a plurality of tasks.

15. A computer system for compiling operations for a neural network processor circuit, the computer system comprising:

a computer processor; and a non-transitory computer readable storage medium storing executable code, the executable code when executed by the computer processor cause the computer processor to perform steps comprising:

analyzing, by a compiler, characteristics of input data and a neural network to be processed by the neural network processor circuit;

allocating, by the compiler and based on the characteristics of the input data and the neural network, a first memory portion of a data buffer in a neural network processor circuit for storing a portion of the input data received from a memory external to the neural network processor circuit, wherein work units are derived from the portion of the input data and provided to neural engine circuits of the neural network processor circuit to perform neural network operations on the work units using one or more kernels;

allocating, by the compiler and based on the characteristics of the input data and the neural network, a second memory portion of the data buffer in the neural network processor circuit for storing output values generated at the neural engine circuits of the neural network processor circuit before storing in the memory external to the neural network processor circuit; and allocating, by the compiler and based on the characteristics of the input data and the neural network, a third memory portion of the data buffer in the neural network processor circuit to store intermediate data generated at the neural engine circuits of the neural network processor circuit in a first processing cycle by performing the neural network operations and provided to the neural engine circuits of the neural network processor circuit in a second processing cycle subsequent to the first processing cycle to generate subsequent intermediate data or the output values generated at the neural engine circuits of the neural network processor circuit.

16. The computer system of claim 15, wherein the executable code when executed by the computer processor further causes the computer processor to perform steps comprising:
generating cache information for sending to a cache device between the neural network processor circuit and the memory external to the neural network processor circuit based on the characteristics of the input data and the neural network, the cache information enhancing efficiency of a caching operation associated with sending the input data from the memory external to the neural network processor circuit to the data buffer in the neural network processor circuit.

17. The computer system of claim 15, wherein the executable code when executed by the computer processor further causes the computer processor to perform steps comprising:
generating task descriptors for sending to a neural task manager of the neural network processor circuit, the task descriptors indicating at least the allocations of the first memory portion, the second memory portion, and the third memory portion of the data buffer in the neural network processor circuit.

\* \* \* \* \*

UNITED STATES PATENT AND TRADEMARK OFFICE
CERTIFICATE OF CORRECTION

PATENT NO. : 11,340,936 B2
APPLICATION NO. : 15/971208
DATED : May 24, 2022
INVENTOR(S) : Lee et al.

Page 1 of 1

It is certified that error appears in the above-identified patent and that said Letters Patent is hereby corrected as shown below:

In the Claims

In Column 18, in Claim 6, Line 48, after "comprising" insert -- : --.

Signed and Sealed this
Twentieth Day of September, 2022

*Katherine Kelly Vidal*

Katherine Kelly Vidal
*Director of the United States Patent and Trademark Office*